No. 750,159. PATENTED JAN. 19, 1904.
R. BRANDT.
KETTLE.
APPLICATION FILED JAN. 13, 1903.
NO MODEL.
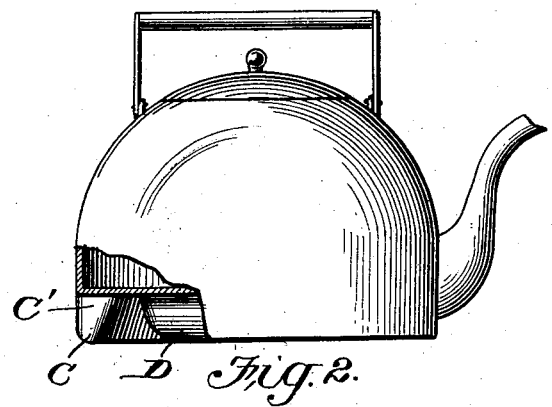
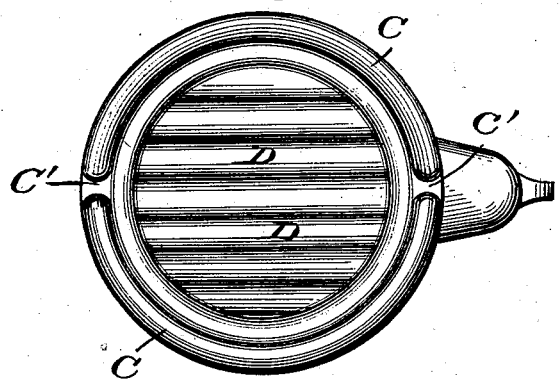
WITNESSES:
Jos. A. Ryan
Amos W Hart
INVENTOR
Rudolph Brandt.
BY Munn & Co.
ATTORNEYS No. 750,159. Patented January 19, 1904.

UNITED STATES PATENT OFFICE.

RUDOLPH BRANDT, OF ATHENS, GEORGIA.

KETTLE.

SPECIFICATION forming part of Letters Patent No. 750,159, dated January 19, 1904.

Application filed January 13, 1903. Serial No. 138,896. (No model.)

*To all whom it may concern:*

Be it known that I, RUDOLPH BRANDT, a citizen of the United States, and a resident of Athens, in the county of Clarke and State of Georgia, have made certain new and useful Improvements in Kettles, of which the following is a specification.

My invention is an improvement in kettles, having for an object to provide means whereby the surface within a given area exposed to the heat may be increased in order that the contents of the kettle may be boiled in less time than with the ordinary flat-bottomed kettle, and the invention may be embodied in kettles of all kinds, including double boilers for kitchen use, boilers for candy-making, those used in the preparation of chemicals, in cabinet-makers' glue-pots, chafing-dishes, tea-kettles of all kinds, evaporating-pans, and the like; and the invention consists in certain novel constructions and combinations of parts, as will be hereinafter described and claimed.

In the drawings, Figure 1 is a side elevation, partly in section, and Fig. 2 is a bottom plan view, of a kettle embodying my invention.

By my invention I seek to increase the surface exposed to the action of heat by fluting or corrugating the bottom of the kettle in the manner which I will now describe.

As shown, the bottom of the kettle is formed with the circular continuous rim corrugation C, having the outlet-notches C' and parallel corrugations D extending within the rim corrugation C, the space between the parallel corrugations discharging to the draft-space within the rim corrugation. It will be noticed I show these notches in the rim corrugation in Fig. 2 at C', and I have shown two of these notches in line with the direction of length of the parallel corrugations D, the said notches affording natural draft-outlets and increasing the tendency of the heat to pass up between the parallel corrugations D, and so act upon the entire surface of the bottom, as will be understood from Fig. 2. It will further be noticed that the corrugations are sloped or inclined on their sides and ends, thus facilitating the passage of the flames into contact with all portions of the corrugations and securing a desirable action of the heat upon the entire surface of the bottom.

Having thus described my invention, what I claim as new, and desire to secure by Letters Patent, is—

A kettle or boiler having its bottom provided with an annular rim corrugation and with a circular draft-space within the same and an outlet notch or notches, and having within said annular corrugation parallel corrugations, the draft-spaces between said parallel corrugations discharging at their ends into the circular draft-space within the annular corrugation substantially as and for the purposes set forth.

RUDOLPH BRANDT.

Witnesses:
G. F. STEPHENSON,
A. G. HAUGHEY.